(12) United States Patent
Kim et al.

(10) Patent No.: US 7,181,636 B2
(45) Date of Patent: Feb. 20, 2007

(54) METHOD OF ENSURING SYNCHRONOUS PRESENTATION OF ADDITIONAL DATA WITH AUDIO DATA RECORDED ON A REWRITABLE RECORDING MEDIUM

(75) Inventors: Hyung Sun Kim, Seoul (KR); Kang Soo Seo, Kyunggi-do (KR); Byung Jin Kim, Kyunggi-do (KR); Soung Hyun Um, Anyang-si (KR)

(73) Assignee: LG Electronics Inc., Seoul (KR)

( * ) Notice: Subject to any disclaimer, the term of this patent is extended or adjusted under 35 U.S.C. 154(b) by 418 days.

(21) Appl. No.: 10/305,020

(22) Filed: Nov. 27, 2002

(65) Prior Publication Data
US 2003/0101364 A1 May 29, 2003

(30) Foreign Application Priority Data
Nov. 27, 2001 (KR) .................. 10-2001-0074382

(51) Int. Cl.
*G06F 1/12* (2006.01)
(52) U.S. Cl. .................. 713/400; 713/375; 713/400; 713/401; 713/502; 360/18; 360/69; 360/70; 369/1; 369/13.01; 352/12; 352/23; 352/63; 386/46; 386/71; 386/84
(58) Field of Classification Search .......... 713/375, 713/400, 401; 360/18, 69, 70; 369/1, 13.01; 386/46, 71, 84; 352/12, 23, 63
See application file for complete search history.

(56) References Cited

U.S. PATENT DOCUMENTS

| | | | | |
|---|---|---|---|---|
| 5,294,982 A | * | 3/1994 | Salomon et al. ............ 348/461 |
| 5,701,511 A | * | 12/1997 | Smith ...................... 715/500.1 |
| 5,960,152 A | * | 9/1999 | Sawabe et al. ............... 386/98 |
| 6,172,988 B1 | * | 1/2001 | Tiernan et al. ............. 370/473 |
| 6,173,113 B1 | * | 1/2001 | Okada et al. ................. 386/95 |
| 6,259,858 B1 | * | 7/2001 | Ando et al. .................. 386/95 |
| 6,414,725 B1 | * | 7/2002 | Clarin et al. ................ 348/714 |
| 6,429,364 B1 | * | 8/2002 | Muraki et al. ................ 84/600 |
| 6,441,291 B2 | * | 8/2002 | Hasegawa et al. ............ 84/609 |
| 6,453,119 B1 | * | 9/2002 | Maruyama et al. ........... 386/95 |
| 6,467,061 B2 | * | 10/2002 | Chung et al. ............... 714/763 |
| 6,542,694 B2 | * | 4/2003 | Ando et al. .................. 386/95 |
| 6,553,182 B2 | * | 4/2003 | Ando et al. .................. 386/95 |
| 6,580,873 B2 | * | 6/2003 | Ando et al. .................. 386/95 |
| 6,584,152 B2 | * | 6/2003 | Sporer et al. .......... 375/240.01 |

(Continued)

FOREIGN PATENT DOCUMENTS

JP    2001-202755 A    7/2001

(Continued)

*Primary Examiner*—A. Elamin
*Assistant Examiner*—Nitin C. Patel
(74) *Attorney, Agent, or Firm*—Birch, Stewart, Kolasch & Birch, LLP

(57) ABSTRACT

A recording medium and a method and apparatus for managing data are provided. The method includes recording additional data in a data file separate from a file containing main data and recording navigation information that links the main data and the additional data. The additional data are segmented into a plurality of predetermined units, each of the predetermined units including time information indicating a presentation start time of the corresponding unit.

33 Claims, 6 Drawing Sheets

U.S. PATENT DOCUMENTS

| | | | |
|---|---|---|---|
| 6,584,274 B2 * | 6/2003 | Ando et al. | 386/83 |
| 6,597,861 B1 * | 7/2003 | Tozaki et al. | 386/104 |
| 6,625,388 B2 * | 9/2003 | Winter et al. | 386/83 |
| 6,654,543 B2 * | 11/2003 | Ando et al. | 386/95 |
| 6,654,863 B2 * | 11/2003 | Nishio | 711/162 |
| 6,668,158 B1 * | 12/2003 | Tsutsui et al. | 455/12.1 |
| 6,788,880 B1 * | 9/2004 | Fuchigami et al. | 386/96 |
| 6,802,019 B1 * | 10/2004 | Lauder | 713/400 |

FOREIGN PATENT DOCUMENTS

| | | |
|---|---|---|
| KR | 2001-0024820 | 3/2001 |
| WO | WO-00/26911 | 5/2000 |

\* cited by examiner to contain lyrics of recorded songs

FIG. 4

*Original Progam Chain Information (ORG_PGCI)*

| |
|---|
| PGC General Information (PGC_GI) |
| PG Information #1 (PGI #1) |
| ⋮ |
| PG Information #m (PGI #m) |
| CI Search Pointer #1 (CI_SRP #1) |
| ⋮ |
| CI Search Pointer #n (CI_SRP #n) |
| Cell Information #1 (CI #1) |
| ⋮ |
| Cell Information #n (CI #n) |

| | |
|---|---|
| C_TY | Cell Type |
| PB_INF | Playback Information |
| AOBI_SRPN | AOBI Search Pointer Number |
| ASVUI_SRPN | ASVUI Search Pointer Number |
| ALUI_SPRN | ALUI Search Pointer Number |
| ASV_DMD | Display Mode of ASV |
| C_EPI_Ns | Number of C_EPIs |
| C_A_S_PTM | Audio Start PTM of this Cell |
| C_A_E_PTM | Audio End PTM of this Cell |

FIG. 6

*Real Time Record Audio Management*
*(RTR_AMG)*

| |
|---|
| RTR Audio Manager General Information (RTR_AMGI) |
| Audio File Information Table (AUDFIT) |
| Audio Still Video File Information Table (ASVFIT) |
| Audio Still Video File Information Table (ASVFIT) |
| Audio Lyric File Information Table (ALFIT) |
| User Defined PGC Information Table (UD_PGCIT) |
| Text Data Manager (TXTDT_MG) |
| Manufacture's Information Table (MNFIT) |

FIG. 7

*Audio Lyric File Information Table (ALFIT)*

| Audio Lyric FIT Information (ALFITI) | | ALFI_Ns | Number of ALFIs |
|---|---|---|---|
| | | AL_I_Ns | Number of AL_Is |
| | | ALFIT_EA | End Address of ALFIT |
| Audio Lyric File Information (ALFI) | ALFI Genaral Information (ALFI_GI) | CHRS | Charater Set |
| | | ALUI_SRP_Ns | Number of ALUI_SRPs |
| | | ALU_MG_EA | End Address of ALU_MG |
| | ALUI Search Pointer #1 (ALUI_SRP #1) | ALU_SA | Start Address of ALU |
| | | ALU_SZ | Size of ALU |
| | | L_ATR | Lyric Attribute |
| | ALUI Search Pointer #2 (ALUI_SRP #2) | ALU_SA | Start Address of ALU |
| | | ALU_SZ | Size of ALU |
| | | L_ATR | Lyric Attribute |
| | ⋮ | ⋮ | ⋮ |
| | ALUI Search Pointer #n (ALUI_SRP #n) | ALUI_SA | Start Address of ALU |
| | | ALUI_SZ | Size of ALU |
| | | L_ATR | Lyric Attribute |

*file of 'AR_Lyric.ARO'*

| ALU #1 (ALU #1) | IDCD | Time #1 | SG_L_TXT#1 | ---- | IDCD | Time# k | SG_L_TXT#k |
|---|---|---|---|---|---|---|---|
| ALU #2 (ALU #2) | IDCD | Time #1 | SG_L_TXT#1 | ---- | IDCD | Time# p | SG_L_TXT#p |
| ⋮ | ⋮ | ⋮ | ⋮ | ⋮ | ⋮ | ⋮ | ⋮ |
| ALU #n (ALU #n) | IDCD | Time #1 | SG_L_TXT#1 | ---- | IDCD | Time# s | SG_L_TXT#s |

METHOD OF ENSURING SYNCHRONOUS PRESENTATION OF ADDITIONAL DATA WITH AUDIO DATA RECORDED ON A REWRITABLE RECORDING MEDIUM

FIELD OF THE INVENTION

The present invention relates to a method of recording additional data such as layric and user input data to be in synchronization with audio data on a rewritable recording medium, and of reproducing them synchronously therefrom.

DESCRIPTION OF THE RELATED ART

A disk-type recording medium such as a Compact Disk (CD) can store high-quality digital audio data permanently, so that it is very popular recording medium in these days.

Recently, a Digital Versatile Disk (called 'DVD' hereinafter) has been developed as a new disk-type recording medium. A DVD can store much larger size than a CD, that is, high-quality moving pictures or audio data are recorded on a DVD for much longer time. Therefore, a DVD will be used widely in the near future.

There are three types in a DVD, DVD-ROM for read-only, DVD-R for write-once, and DVD-RAM or DVD-RW for rewritable. For a rewritable DVD, the standardization of data writing format is in progress.

FIG. 1 is a block diagram of an optical disk device that records/reproduces audio data to/from a recording medium.

The disk device configured as FIG. 1 comprises an optical pickup 11 reading signals recorded on a rewritable DVD 10 such as a DVD-RW and writing data streams processed into writable signals onto the rewritable DVD 10; a reproduced signal processor 12 restoring the read signals into compressed digital data; a decoder 13 decoding the compressed digital data to original data; a sampler 18 digitizing an inputted analog signal at a preset sampling rate; an encoder 17 encoding the digitized LPCM data into MPEG-, or AC3-formatted data; a writing processor 16 converting the encoded data from the encoder 17 or LPCM data from the sampler 18 into signals suitable to be written; a controller 14 controlling all elements to conduct user's commands such as playback or record; and a memory 15 for storing data temporally.

If an analog signal is applied to the disk device of FIG. 1, the sampler 18 samples the analog signal at the preset sampling rate. Each sampled signal, which is LPCM data, is applied to the encoder 17 that encodes a block of sampled data into compressed data of pre-specified format, for example, MPEG format. The compressed data are then applied to the writing processor 16.

The writing processor 16 converts a series of the compressed data into binary signals which are written in mark/space patterns on the writable DVD 10. Already-compressed digital data from outside are directly processed by the writing processor 16 to be written onto the writable DVD 10.

After recording of audio data, navigation data for the audio data are created and then recorded on the writable DVD 10.

FIG. 2 shows the structure of RTR_AMG (Real Time Record Audio ManaGement) recorded as navigation data on a rewritable disk. The RTR_AMG includes RTR_AMGI (RTR Audio Manager General Information), AUDFIT (AUDio File Information Table), ASVFIT (Audio Still Video File Information Table), ORG_PGCI (ORGiginal PGC (ProGram Chain) Information), UD_PGCIT (User Defined PGC Information Table), TXTDT_MG (TeXT DaTa ManaGer), and MNFIT (MaNufacturer's Information Table).

The TXTDT_MG can include additional data of recorded songs such as lyrics. Therefore, when the controller 14 selects and reproduces a recorded song from the rewritable disk 10, it is able to present lyric text in characters on a screen by reading it from the TXTDT_MG.

Consequently, when a user selects a recorded song to play back from the rewritable DVD 10, he or she is able to view its lyric on a screen.

However, each of additional data such as a lyric included in the TXTDT_MG is linked with a recorded song wholly. In other words, a lyric in the TXTDT_MG can not have information to synchronize in detail with a recorded song. Therefore, it is impossible to display lyric data step by step at the same speed that the recorded song is reproduced from a rewritable DVD.

SUMMARY OF THE INVENTION

It is an object of the present invention to provide a synchronizing method that records additional data such as lyric data and user input data to be synchronized minutely with audio data on a rewritable recording medium.

It is another object of the present invention to provide a synchronizing method that reproduces synchronously audio data and additional data thereof that have been recorded with minutely-synchronizing information.

An audio data related information recording method in accordance with the present invention segmentizes additional information related with audio data recorded on a rewritable recording medium, records the information segments, and further records synchronizing information, e.g, time length to keep up presentation of each information segment or start time to present each information segment, in the vicinity of said each information segment in order to present each information segment in sychronization with a corresponding part of the recorded audio data.

An audio data related information reproducing method in accordance with the present invention reads sequentially a plurality of information segments constituting a piece of additional information related with audio data recorded on a rewritable recording medium, and makes presentation of each information segment based on synchronizing information, e.g, time length to keep up presentation of each information segment or start time to present each information segment, recorded in association with each information segment in order to present each information segment in sychronization with a corresponding part of the recorded audio data.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings:

FIG. 4 shows CI (Cell Information) structured according to the present invention;

FIG. 6 shows an RTR_AMG structurced according to another embodiment of the present invention; and FIG. 7 shows ALFIT (Audio Lyric File Information Table) structured according to another embodiment of the present invention.

DETAILED DESCRIPTION OF THE PREFERRED EMBODIMENTS

In order that the invention may be fully understood, a preferred embodiment thereof will now be described with reference to the accompanying drawings.

In an audio data recording method in accordance with the present invention, lyric or user data related with a song recorded on a rewritable disk such as DVD-RW is segmentized into several units, first. Each segmentized unit is linked with each corresponding part of the recorded song through segment sycnhronizing information for the purpose of minute synchronization of song and additional data.

Figure 1:
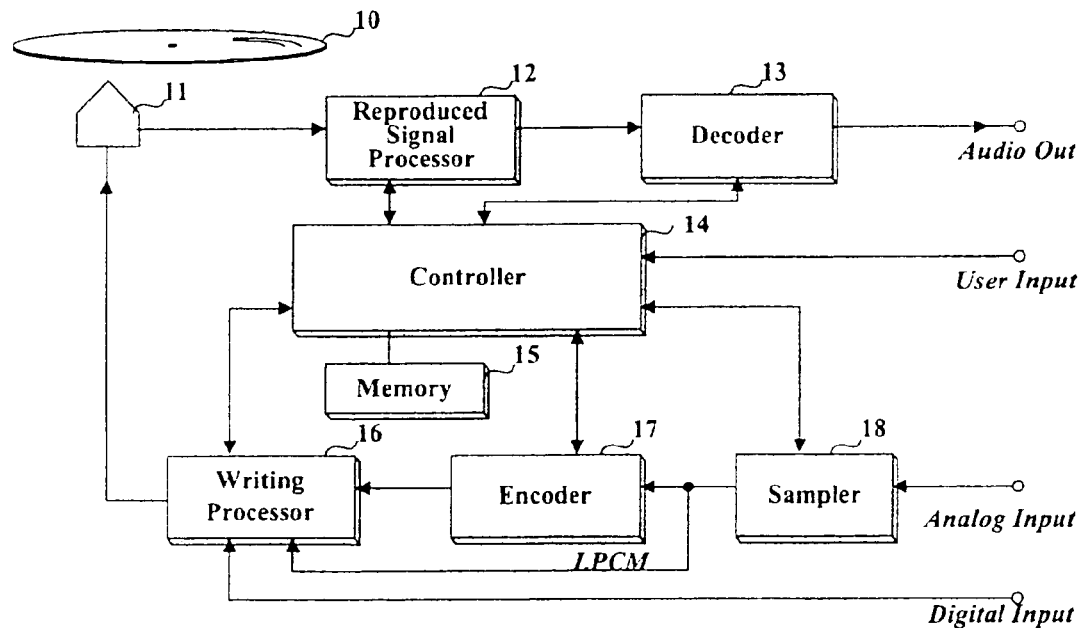
FIG. 1 is a block diagram of an optical disk device that records/reproduces audio data to/from a recording medium.
Figure 2:
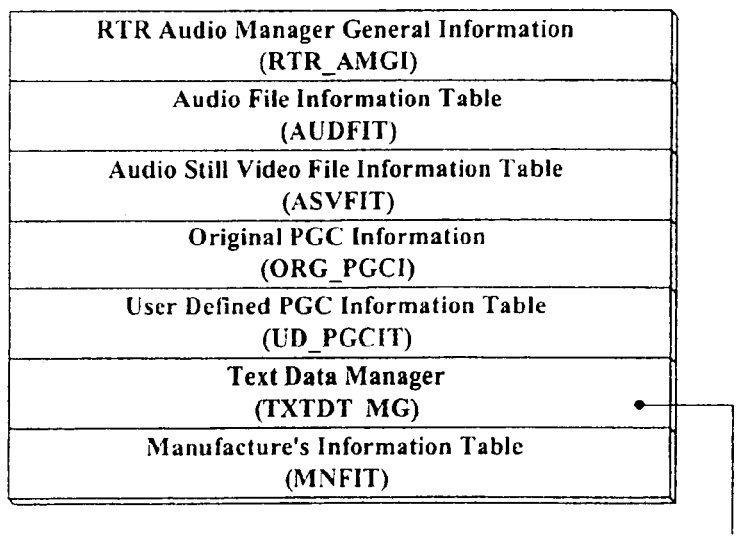
FIG. 2 shows the structure of RTR_AMG (Real Time Record Audio ManaGement) recorded as navigation data on a rewritable disk.
Figure 3:
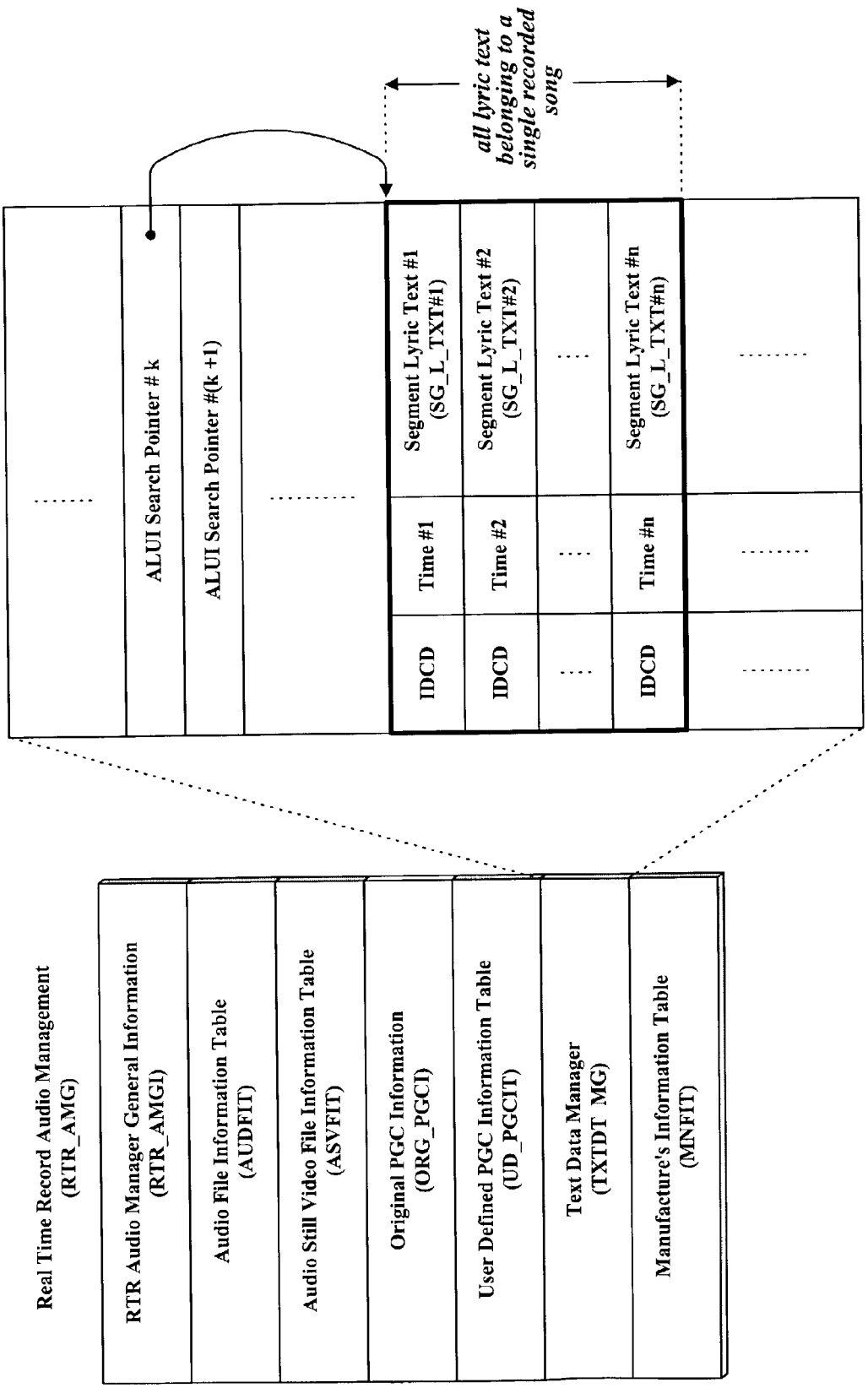
FIG. 3 shows an RTR_AMG in which TXTDT_MG (TeXT DaTa ManaGer) structured according to the present invention is included.

FIG. 3 shows an RTR_AMG in which TXTDT_MG structured according to an embodiment of the present invention is included.

As shown in FIG. 3, RTR_AMG is composed of RTR_AMGI, AUDFIT, ASVFIT, ORG_PGCI, UD_PGCIT, TXTDT_MG, and MNFIT. The TXTDT_MG in FIG. 3 is composed of respective ALUI (Audio Lylic Unit Information) search pointers and coresponding pieces of ALUI. Each ALUI includes lyric segments 'SG_L_TXT #i', which is segmentized lyric text, and their individual output-time related information 'Time #i'.

The output-time related information 'Time #i' is time-length, which a corresponding lyric segment is kept displayed for, or instant time when a corresponding lyric segment starts to be displayed. This time information is also used to differentiate a linked lyric segment from several lyric segments displayed altogether by different color or font for a specified duration.

Each lyric segment includes an ID code 'IDCD' as shown in FIG. 3. The ID code is used to indicate that each segmentized unit has output-time related information, that each segmentized unit includes lyric or user data, or that the output-time related information is duration or start time.

Each group of segmentized units is linked with a recorded song through each ALUI search pointer in TXTDT_MG as shown in FIG. 3. For example, an ALUI search pointer linked with a recorded song points a start position of the first lyric segment of an associated segment group.

To link a recorded song with an ALUI search pointer, a piece of CI (Cell Information) related with an AOB (Audio OBject), which is corresponding to a single recorded song in general, is structured in the ORG_PGCI as shown in FIG. 4.

Each CI includes an AOBI_SRPN (AOB Information SeaRch Pointer Number) for indexing information location of a related AOB (or song), an ASVUI_SRNP (ASVU (Audio Still Video Unit) Information SeaRch Pointer Number) for indexing information location of still video data linked with an AOB, and an ALUI search pointer number 'ALUI_SRPN' for indexing an ALUI search pointer in the TXTDT_MG that points a segment group containing a full lyric text related with an AOB.

Thus, if a song, namely, an AOB is chosen, the controller 14 reads the number written in ALUI_SPRN of CI associated with the selected AOB, and reads an address in ALUI search pointer indexed by the read number in the TXTDT_MG. The location of lyric text related with the selected song is found by this read address.

Then, lyric segments are retrieved sequentially from the addressed location by the reproduced signal processor 12. At this time, the controller 14 examines an ID code preceding each lyric segment. If the ID code is indicative of type of output-time related information, e.g., a time length for which the following lyric segment 'SG_L_TXT #i' is displayed, the controller 14 keeps outputting each lyric segment for a duration specified by the time length and changes current lyric segment with the next one after the time length expires. This operation continues until the end of AOB or stop request is received.

Figure 5:
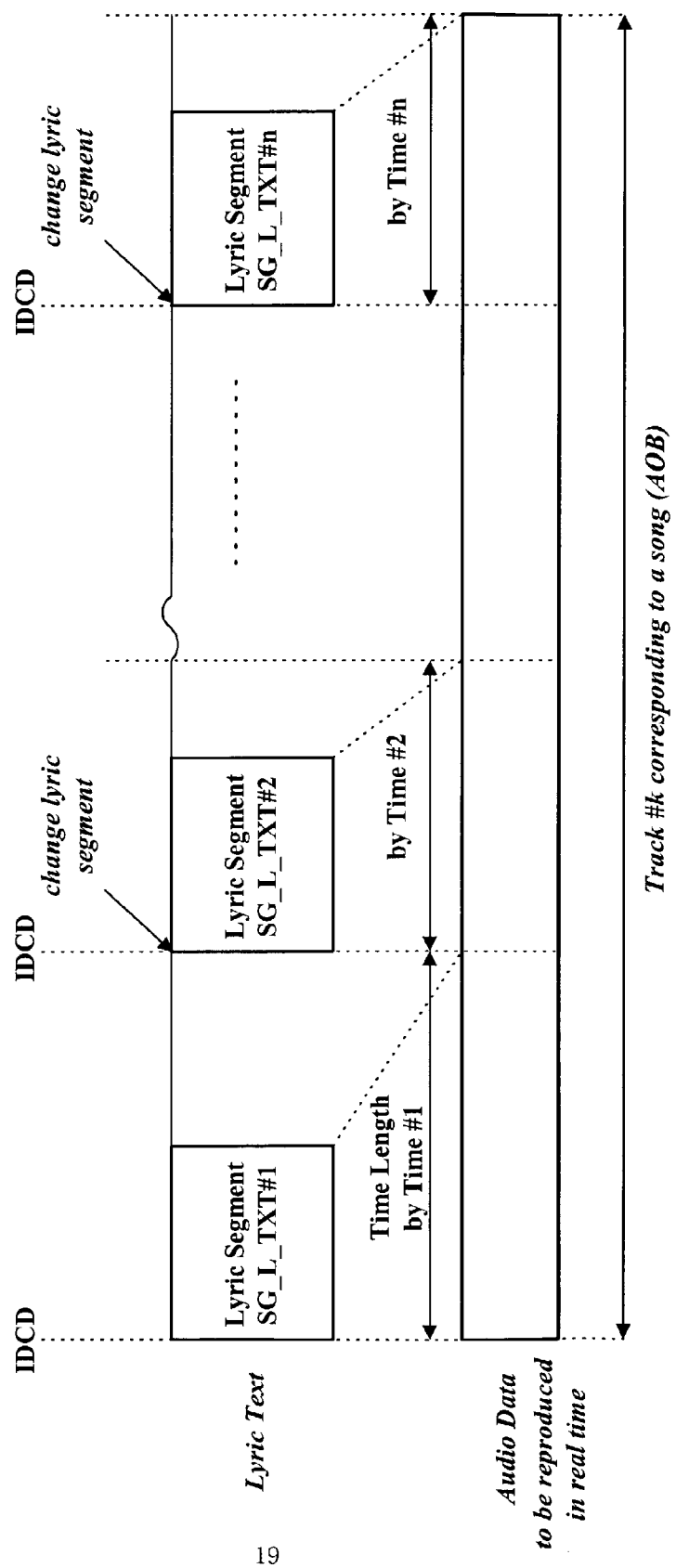
FIG. 5 illustrates an example of a continuous and syncrhonous display of a series of lyric segments together with reproduced audio data audio according to the present invention.

FIG. 5 illustrates continuous and syncrhonous display of a series of lyric segments together with reproduced audio data belonging to the selected AOB.

Referring to FIG. 5, if the ID code is indicative of presentation start time of each lyric segment, the controller 14 outputs each lyric segment the moment an elasped time after reproducing the chosen AOB (or song) becomes equal to the start time specified by field 'Time'. The currently-outputted lyric segment keeps being outputted until the next segment is outputted at its start time.

If the ID code is indicative of not the type of output-time related information but the type of additional information, e.g., user data, the controller 14 processes the segmentized additional information adquately for the designated type.

If the ID code indicates that there is no output-time related information in lyric segments, then the lyric segments are sequentially read out irrespective of time. This operation seems to correspond to a conventional lyric data displaying method.

The lyric segments related with a recorded song may be written in a file other than the RTR_AMG, instead of the TXTDT_MG.

FIG. 6 shows an RTR_AMG structurced according to another embodiment of the present invention. The RTR_AMG of FIG. 6 includes an ALFIT (Audio Lyric File Information Table) for storing in another file the lyric data that are composed of segmentized information such as lyrics or user data of all recorded songs.

FIG. 7 shows the structure of the ALFIT of FIG. 6. The ALFIT is composed of ALFITI (ALFIT Information) and ALFI. The ALFITI includes fields of 'ALFI_Ns' reserved for the number of audio lyric information files, 'AL_I_Ns' for the number of pieces of audio lyric informaiton, and 'ALFIT_EA' for an end address of ALFIT.

The ALFI is composed of ALFI_GI (ALFI General Information) and a plurality of ALUI (Audio Lyric Unit Information) search pointers, each including 'ALU_SA' for a start address of a lyric unit, 'ALU_SZ' for size of a lyric unit, and 'L_ATR' for attribute of a lyric.

The ALU_SA in each ALUI search pointer points to the location of a corresponding ALU (Audio Lyric Unit) in a lyric file named by 'AR_Lyric.ARO' that is not included in the RTR_AMG. Each ALU in the lyric file 'AR_Lyric.ARO' includes a lyric text associated with a single recorded song, and the lyric text is divided into several segments 'SG_L_TXT #i'. Each lyric segment also has output-time related information 'Time' and ID code 'IDCD as described in the aforementioned embodiment.

According to this structure of the RTR_AMG, the ALUI_search pointer number contained in CI indexes an ALUI serach pointer pointing a lyric unit in the file 'AR_Lyric.ARO' associated with a recorded AOB, namely song.

Thus, if a song, namely, an AOB is chosen, the controller 14 reads the number written in ALUI_SPRN of CI associated with the selected AOB, and reads an address in ALUI search pointer contained in the field 'ALFI' indexed by the read number. The location of a lyric unit related with the selected song is found in the file 'AR_Lyric.ARO' by this read address.

Then, lyric segments are retrieved sequentially from the first segmement 'SG_L_TXT # 1' at the addressed location in the file 'AR_Lyric.ARO' by the reproduced signal processor 12. At this time, the controller 14 examines an ID code preceding each lyric segment.

If the ID code is indicative of the type of output-time related information, the controller 14 conducts continuous and syncrhonous display of a series of lyric segments together with reproduced audio data belonging to the selected AOB. In this lyric synchronous display operation, a just-displayed lyric segment can be differentiated by color or font from neighboring lyric segments displayed altogether.

The above-explained lyric data synchronizing method ensures minutely-synchronous lyric presentation with audio data, e.g., song being reproduced in real time from a rewritable recording medium. Thus, a user is able to enjoy a reproduced song better through the lyric text displayed in synchronization with the song.

The detailed description of the invention has been directed to certain exemplary embodiments, various modifications of these embodiments, as well as alternative embodiments, will be suggested to those skilled in the art. The invention encompasses any modifications or alternative embodiments that fall within the scope of the claims.

What is claimed is:

1. A method of managing data recorded on a recording medium reproducible by a data reproducing apparatus, the method comprising:
    recording additional data on the recording medium in a data file separate from a file containing main data also recorded on the recording medium, the additional data being segmented into a plurality of predetermined units, each of the predetermined units including time information indicating a presentation start time of the corresponding unit to enable a synchronization of the main data and the additional data when the main data and the additional data are reproduced by the data reproducing apparatus; and
    recording a navigation information file on the recording medium that links the main data and the additional data,
    wherein the navigation information file is separated from the file containing the main data and separated from the data file containing the additional data, and
    wherein the additional data includes text data for a subtitle.

2. The method of claim 1, wherein the additional data includes text data associated with the main data.

3. The method of claim 1, wherein each of the predetermined units further includes type information indicating a type of the additional data.

4. The method of claim 1, further comprising:
    recording attribute information on the recording medium associated with the additional data.

5. The method of claim 4, wherein the attribute information includes font information associated with the additional data.

6. The method of claim 1, wherein the recording medium is an optical disc.

7. The method of claim 1, further comprising:
    reproducing and presenting, from the recording medium, the main data along with the additional data linked with the main data using the data reproducing apparatus.

8. A recording medium on which data reproducible by a reproducing apparatus is recorded, the data recorded on the recording medium further comprising:
    additional data recorded in a data file being separate from a file containing main data recorded on the recording medium, the additional data being segmented into a plurality of predetermined units, each of the predetermined units including time information indicating a presentation start time of the corresponding unit to enable a synchronization of the main data and the additional data when the main data and the additional data are reproduced by the reproducing apparatus; and
    a navigation information file that links the main data and the additional data,
    wherein the navigation information file is separated from the file containing the main data and separated from the data file containing the additional data, and
    wherein the additional data includes text data for a subtitle.

9. The recording medium of claim 8, wherein the additional data includes text data associated with the main data.

10. The recording medium of claim 8, wherein each of the predetermined units further includes type information indicating a type of the additional data.

11. The recording medium of claim 8, further comprising:
    attribute information associated with the additional data.

12. The recording medium of claim 11, wherein the attribute information includes font information associated with the additional data.

13. The recording medium of claim 8, wherein the recording medium is an optical disc.

14. An apparatus for managing data recorded on a recording medium, comprising:
    a recording part to record additional data on the recording medium in a data file separate from a file containing main data also recorded on the recording medium, the additional data being segmented into a plurality of predetermined units, each of the predetermined units including time information indicating a presentation start time of the corresponding unit to enable a synchronization of the main data and the additional data when the main data and the additional data are reproduced by a reproducing apparatus, and to record a navigation information file that links the main data and the additional data,
    wherein the navigation information file is separated from the file containing the main data and separated from the data file containing the additional data, and
    wherein the additional data includes text data for a subtitle.

15. The apparatus of claim 14, wherein the additional data includes text data associated with the main data.

16. The apparatus of claim 14, wherein each of the predetermined units further includes type information indicating a type of the additional data.

17. The apparatus of claim 14, wherein the recording part further records on the recording medium attribute information associated with the additional data.

18. The apparatus of claim 17, wherein the attribute information includes font information associated with the additional data.

19. The apparatus of claim 14, wherein the recording part records the data file and the navigation information file on the recording medium.

20. The apparatus of claim 19, wherein the recording medium is an optical disc.

21. The apparatus of claim 19, further comprising:
a reproducing part to reproduce and present, from the recording medium, the main data along with the additional data linked with the main data.

22. A method of reproducing data recorded on a recording medium recorded by a data recording apparatus, the method comprising:
reading additional data recorded on the recording medium in a data file separate from a file containing main data also recorded on the recording medium, the additional data being segmented into a plurality of predetermined units, each of the predetermined units including time information indicating a presentation start time of the corresponding unit;
reading a navigation information file recorded on the recording medium that links the main data and the additional data; and
reproducing the main data along with the additional data based on the navigation information,
wherein the reproducing step includes synchronizing the main data and the additional data during the reproduction of the main data and the additional data,
wherein the navigation information file is separated from the file containing the main data and separated from the data file containing the additional data, and
wherein the additional data includes text data for a subtitle.

23. The method of claim 22, wherein the additional data includes text data associated with the main data.

24. The method of claim 22, wherein each of the predetermined units further includes type information indicating a type of the additional data.

25. The method of claim 22, further comprising:
reading attribute information recorded on the recording medium associated with the additional data,
wherein the step of reproducing the main data along with the additional data based on the navigation information reproduces the additional data based on the attribute information.

26. The method of claim 25, wherein the attribute information includes font information associated with the additional data.

27. The method of claim 22, wherein the recording medium is an optical disc.

28. An apparatus for reproducing data recorded on a recording medium, comprising:
a reading part to read a file containing main data recorded on the recording medium, to read additional data also recorded on the recording medium, the additional data being segmented into a plurality of predetermined units, each of the predetermined units including time information indicating a presentation start time of the corresponding unit, and to read a navigation information file recorded on the recording medium that links the main data and the additional data; and
an output part to output the main data and the additional data based on the navigation information,
wherein the output part synchronizes the main data and the additional data during the outputting of the main data and the additional data,
wherein the navigation information file is separated from the file containing the main data and separated from the data file containing the additional data, and
wherein the additional data includes text data for a subtitle.

29. The apparatus of claim 28, wherein the additional data includes text data associated with the main data.

30. The apparatus of claim 28, wherein each of the predetermined units further includes type information indicating a type of the additional data.

31. The apparatus of claim 28,
wherein the reading part further reads attribute information recorded on the recording medium associated with the additional data, and
wherein the output part outputs the additional data based on the attribute information.

32. The apparatus of claim 31, wherein the attribute information includes font information associated with the additional data.

33. The apparatus of claim 28, wherein the recording medium is an optical disc.

* * * * *